(12) United States Patent
Ware (10) Patent No.: US 11,323,455 B2
(45) Date of Patent: May 3, 2022

(54) SYSTEMS AND METHODS FOR PREVENTING UNAUTHORIZED COMMUNICATION WITH AN END DEVICE ON A COMMUNICATION NETWORK

(71) Applicant: SCHNEIDER ELECTRIC IT CORPORATION, Foxboro, MA (US)

(72) Inventor: Gary R. Ware, Newton, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 199 days.

(21) Appl. No.: 16/411,304

(22) Filed: May 14, 2019

(65) Prior Publication Data

US 2020/0366684 A1    Nov. 19, 2020

(51) Int. Cl.
    *H04L 29/06*      (2006.01)

(52) U.S. Cl.
    CPC ............ *H04L 63/108* (2013.01); *H04L 63/08* (2013.01); *H04L 63/164* (2013.01); *H04L 63/20* (2013.01)

(58) Field of Classification Search
CPC ..... H04L 63/08; H04L 63/107; H04L 63/164; H04L 63/1441; H04L 63/20; H04L 63/108; H04L 63/1425; H04W 4/70; G06F 9/00; G06F 15/16; G06F 21/00
USPC .......................................................... 726/4
See application file for complete search history.

(56) References Cited

U.S. PATENT DOCUMENTS

| | | | |
|---|---|---|---|
| 7,325,248 B2* | 1/2008 | Syvanne | ............. H04L 63/0227 713/166 |
| 10,587,119 B2 | 3/2020 | Marwali et al. | |
| 2007/0171821 A1 | 7/2007 | Matoba | |
| 2008/0077700 A1 | 3/2008 | Hibino | |
| 2018/0205754 A1* | 7/2018 | North | .................. H04L 63/1433 |

(Continued)

FOREIGN PATENT DOCUMENTS

EP      1313290 A1    5/2003

OTHER PUBLICATIONS

Computer Hope—Dictionary Definition: Time-out https://www.computerhope.com/jargon/t/timeout.htm Oct. 4, 2017 (Year: 2017).*

(Continued)

*Primary Examiner* — Benjamin A Kaplan
(74) *Attorney, Agent, or Firm* — Lando & Anastasi, LLP (57) ABSTRACT

Methods and systems are provided for preventing unauthorized communication with an end device on a network, the system comprising an external device and a communication device. The communication device includes an interface configured to be communicatively coupled to the external device, and being configured to receive access attempts from the external device, at least one of which being structured according to a respective communication protocol and being received from a respective communication zone, determine a group of used communication protocols, the group of used communication protocols including protocols according to which the access attempts are structured and being determined based on the respective communication zones of the access attempts, receive, from a first external device, an access attempt structured according to a protocol not in the group of communication protocols, and deny, responsive to determining that the protocol is not in the group of used communication protocols, the access attempt.

20 Claims, 3 Drawing Sheets

(56) References Cited

U.S. PATENT DOCUMENTS

2020/0051349 A1* 2/2020 Campbell ................ G07C 9/22
2020/0259823 A1* 8/2020 Biehl .................... H04L 9/3226

OTHER PUBLICATIONS

Notification of Transmittal of the International Search Report and the Written Opinion of the International Searchng Authority from corresponding PCT/US2020/032691 dated Jul. 21, 2020.

* cited by examiner

SYSTEMS AND METHODS FOR PREVENTING UNAUTHORIZED COMMUNICATION WITH AN END DEVICE ON A COMMUNICATION NETWORK

BACKGROUND

1. Field of the Disclosure

At least one example in accordance with the present disclosure relates generally to device communication protocols and digital security.

2. Discussion of Related Art

Devices may communicate with each other to exchange information using one or more communication protocols. Communication protocols include sets of rules governing a manner by which the devices communicate. Devices may be configured to communicate using a set of communication protocols suitable for the functionality of the device.

SUMMARY

According to one aspect of the disclosure, a system for preventing unauthorized communication with an end device on a communication network is provided, the system comprising at least one external device, and a communication device communicatively coupled to the at least one external device, the communication device including a network interface configured to be communicatively coupled to the at least one external device, and being configured to receive, during a first period of time, access attempts from the at least one external device, wherein one or more of the access attempts are structured according to a respective communication protocol and being received from a respective communication zone, determine a first group of used communication protocols, the first group of used communication protocols including communication protocols according to which the access attempts are structured and being determined based on the respective communication zones of the access attempts, receive, from a first external device, an access attempt structured according to a communication protocol not in the first group of used communication protocols, and deny, responsive to determining that the communication protocol is not in the first group of used communication protocols, the access attempt.

In an embodiment, the communication device is further configured to determine a second group of unused communication protocols, the second group including unused communication protocols which are unused during the first period of time. In some embodiments, the communication device is further configured to disable the unused communication protocols, and send, responsive to disabling the unused communication protocols, a notification to a user indicating the disabling of the unused communication protocols. In one embodiment, determining the second group of unused communication protocols unused during the first period of time is performed periodically.

In some embodiments, the communication device is further configured to determine a basis on which to identify unused communication protocols, the basis including at least one of a per-device basis or a per-zone basis. In at least one embodiment, in denying the access request, the communication device is further configured to determine that unused communication protocols are identified on a per-device basis, determine that an access attempt structured according to the communication protocol of the second group of unused communication protocols has not been received from the first external device in the first period of time, disable the communication protocol for the first external device, and deny the access attempt.

In an embodiment, in denying the access request, the communication device is further configured to determine that unused communication protocols are identified on a per-zone basis, determine that an access attempt structured according to the communication protocol of the second group of unused communication protocols has not been received from a device in a first zone, the first zone being a same zone as the first external device in the first period of time, disable the communication protocol for all devices in the first zone, and deny the access attempt.

In some embodiments, the zone includes one of a foreign zone and a local zone, and wherein the foreign zone includes devices not on a same subnet as the communication device and the local zone includes devices on a same subnet as the communication device. In at least one example, the communication device is further configured to receive a second access attempt structured according to a communication protocol of the first group of used communication protocols, and allow, responsive to determining that the communication protocol is one of the first group of used communication protocols, the second access attempt.

According to an aspect of the disclosure, a non-transitory computer-readable medium storing sequences of computer-executable instructions for preventing unauthorized communication with an end device on a communication network is provided, the sequences of computer-executable instructions including instructions that instruct at least one processor to receive, during a first period of time, access attempts from at least one external device, wherein one or more of the access attempts are structured according to a respective communication protocol and being received from a respective communication zone, determine a first group of used communication protocols, the first group of used communication protocols including communication protocols according to which the access attempts are structured and being determined based on the respective communication zones of the access attempts, receive, from a first external device, an access attempt structured according to a communication protocol not in the first group of used communication protocols, and deny, responsive to determining that the communication protocol is not in the first group of used communication protocols, the access attempt.

In an embodiment, the sequences of computer-executable instructions further include instructions that instruct the at least one processor to determine a second group of unused communication protocols, the second group including unused communication protocols which are unused during the first period of time. In at least one embodiment, the sequences of computer-executable instructions further include instructions that instruct the at least one processor to disable the unused communication protocols, and send, responsive to disabling the unused communication protocols, a notification to a user indicating the disabling of the unused communication protocols.

In one embodiment, the sequences of computer-executable instructions further include instructions that instruct the at least one processor to determine the second group of unused communication protocols periodically. In at least one embodiment, the sequences of computer-executable instructions further include instructions that instruct the at least one processor to determine a basis on which to identify unused communication protocols, the basis including at least one of a per-device basis or a per-zone basis. In an embodiment, in instructing the at least one processor to deny the access request, the sequences of computer-executable instructions further include instructions that instruct the at least one processor to determine that unused communication protocols are identified on a per-device basis, determine that an access attempt structured according to the communication protocol of the second group of unused communication protocols has not been received from the first external device in the first period of time, disable the communication protocol for the first external device, and deny the access attempt.

In an embodiment, in instructing the at least one processor to deny the access request, the sequences of computer-executable instructions further include instructions that instruct the at least one processor to, determine that unused communication protocols are identified on a per-zone basis, determine that an access attempt structured according to the communication protocol of the second group of unused communication protocols has not been received from a device in a first zone, the first zone being a same zone as the first external device in the first period of time, disable the communication protocol for all devices in the first zone, and deny the access attempt.

In some embodiments, the zone includes one of a foreign zone and a local zone, and wherein the foreign zone includes devices not on a same subnet as the communication device and the local zone includes devices on a same subnet as the communication device. In at least one embodiment, the sequences of computer-executable instructions further include instructions that instruct the at least one processor to receive a second access attempt structured according to a communication protocol of the first group of used communication protocols, and allow, responsive to determining that the communication protocol is one of the first group of used communication protocols, the second access attempt.

According to aspects of the disclosure, a method for preventing unauthorized communication with an end device on a communication network is provided including receiving, during a first period of time, access attempts from the at least one external device, wherein one or more of the access attempts are structured according to a respective communication protocol and being received from a respective communication zone, determining a first group of used communication protocols, the first group of used communication protocols including communication protocols according to which the access attempts are structured and being determined based on the respective communication zones of the access attempts, receiving, from a first external device, an access attempt structured according to a communication protocol not in the first group of used communication protocols, and denying, responsive to determining that the communication protocol is not in the first group of used communication protocols, the access attempt.

In an embodiment, the sequences of computer-executable instructions further include instructions that instruct the at least one processor to determine a second group of unused communication protocols, the second group including unused communication protocols which are unused during the first period of time, and disable the unused communication protocols.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, devices may be configured to communicate using one or more communication protocols. Generally speaking, devices may be configured to communicate using communication protocols which the devices are expected to use to communicate during normal operation of the device. Although a device could be configured to communicate using additional communication protocols which the device is unlikely to utilize, doing so may expose the device to unnecessary risk. For example, increasing a number of communication protocols through which the device is accessible increases a number of avenues through which a malicious party could access the device. However, limiting the number of communication protocols for which the device is configured to communicate may negatively impact user experience if the device is unable to receive communications from trusted parties attempting to communicate with the device using a disabled communication protocol.

Embodiments of the present disclosure include a protocol monitor configured to determine which communication protocols to enable on devices. The protocol monitor may be configured to enable communication protocols which trusted parties use to communicate with a device executing the protocol monitor. In one embodiment, the protocol monitor determines which communication protocols a device communicates with during an initial setup period, and disables all other communication protocols at an end of the setup period. After the initial setup period, the protocol monitor may continue to analyze communications sent and received by the device to identify communication protocols which are no longer in use, and responsively disable the unused communication protocols. Accordingly, the protocol monitor operates to decrease an attack surface through which devices may be accessed by malicious users without requiring excessive user interaction to select communication protocols to enable.

Protocol monitors according to aspects of the present disclosure may include software executed by communication devices. In one embodiment, protocol monitors may include software in a Network Management Card (NMC) coupled to a device and configured to control network communication between communication devices. Communication devices may include Internet of Things (IoT) devices configured to communicate with each other. For example, communication devices may include IoT devices in a data center, such as Uninterruptible Power Supplies (UPSs), Power Distribution Units (PDUs), and cooling and environmental control devices. Communication devices executing protocol monitors according to the present disclosure may repeatedly determine which protocols should be enabled or disabled, and act accordingly.

As the communication device receives access attempts from other devices, the communication devices can determine if the access attempts are structured according to an enabled communication protocol. If the communication protocol is enabled, then the device may be allowed to receive the access attempt. If the communication protocol is disabled, then the device may be disallowed from receiving the access attempt or may request permission to grant access from a trusted source, such as an email exchange.

Figure 1:
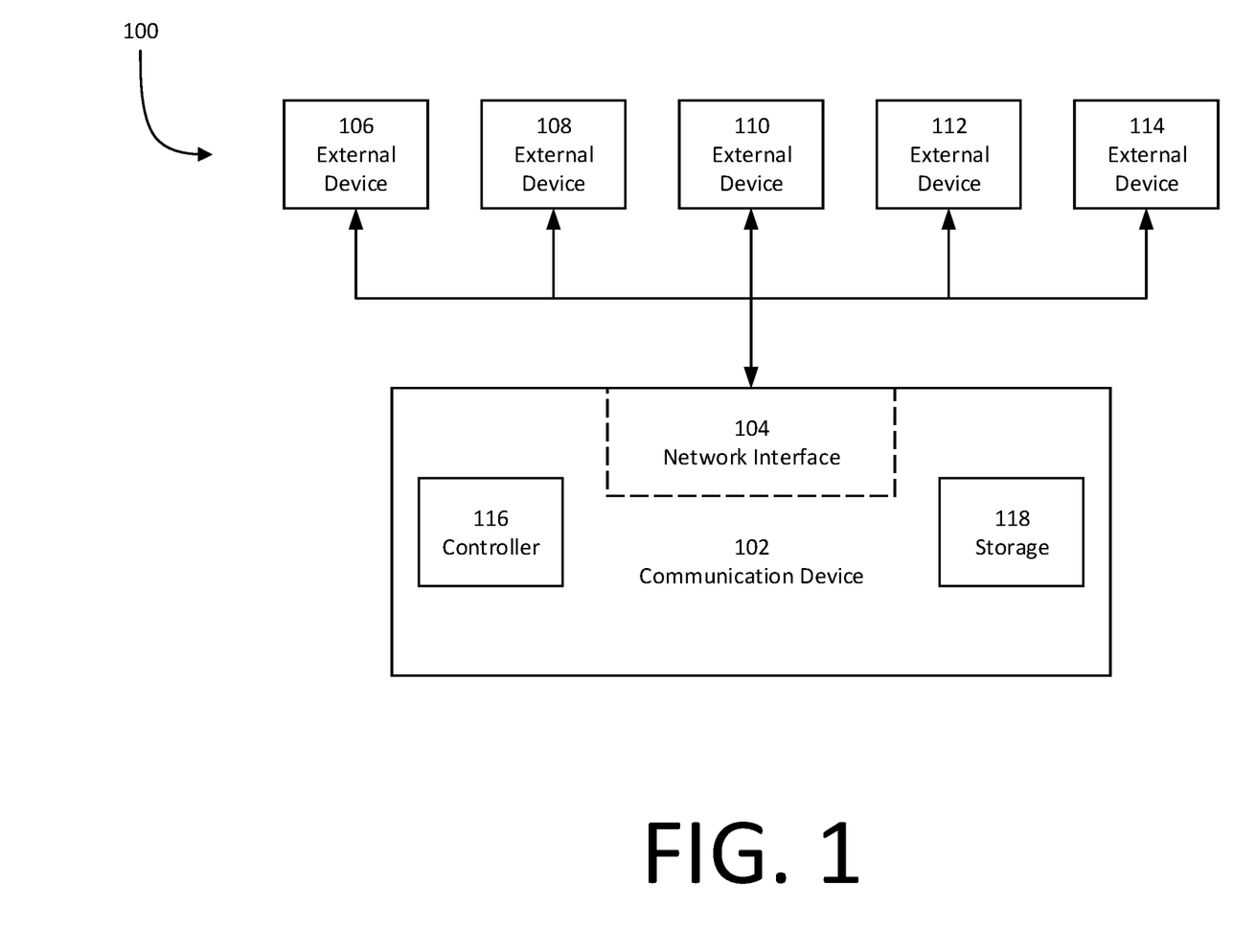
FIG. 1 illustrates a block diagram of a protocol monitoring system according to an embodiment.

FIG. 1 illustrates a block diagram of a communication system 100 according to an embodiment. The communication system 100 includes a communication device 102, a first external device 106, a second external device 108, a third external device 110, a fourth external device 112, and a fifth external device 114. The communication device 102 may be an IoT device, such as a UPS, a PDU, or a cooling and environmental control device. The communication device 102 includes a network interface 104, a controller 116, and storage 118. The network interface 104 may include an NMC configured to execute a protocol monitor. For example, the network interface 104 may receive communications structured according to certain communication protocols from the external devices 106-114, and determine whether to allow or deny the communications, as discussed in greater detail below with respect to FIGS. 2 and 3. The external devices 106-114 may be communicatively coupled to the network interface 104 via a wired and/or wireless connection.

Figure 2:
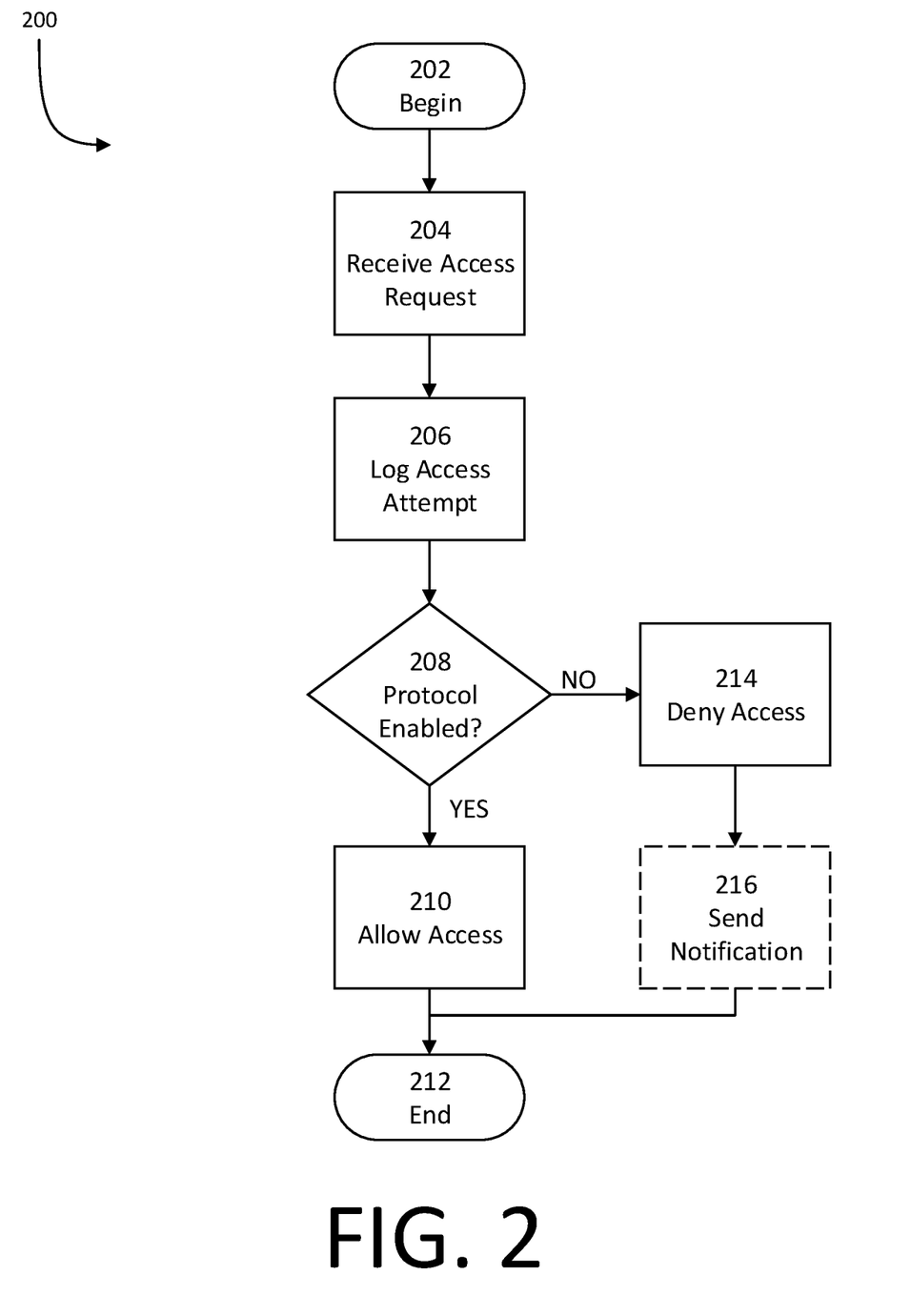
FIG. 2 illustrates a process of handling access attempts according to an embodiment.

FIG. 2 illustrates a process 200 of handling access attempts according to an embodiment. The process 200 may be executed by a communication device, such as the communication device 102. More particularly, the process 200 may be executed by the network interface 104, the controller 116, or a combination of both. The process 200 includes acts of receiving an access attempt, logging the access attempt, determining if an applicable communication protocol is enabled, allowing the access attempt if the applicable communication protocol is enabled, and, if the applicable communication protocol is not enabled, denying the access attempt and optionally sending a notification indicative of the denied access attempt.

At act 202, the process 200 begins. At act 204, an access attempt structured according to a first communication protocol is received by the communication device 102. In one example, the access attempt is received from a transmitting device, such as the first external device 106. At act 206, the access attempt is logged. Logging the access attempt may include storing a timestamp indicative of a time at which the access attempt was received, an Internet Protocol (IP) address and/or Media Access Control (MAC) address of the transmitting device, and a communication protocol according to which the access attempt is structured, including the IP port number, in the storage 116, or storage otherwise accessible to the communication device 104. For example, the access attempt may be logged in a data structure accessible to the network interface 104.

In some embodiments, logging the access attempt may include logging a zone of the transmitting device in lieu of, or in addition to, logging the IP and/or MAC address of the transmitting device. The zone may include a local zone, which includes devices on the same local segment or subnet as the receiving device, or a foreign zone, which includes devices not on the same local segment or subset as the receiving device. For example, the external devices 106 and 108 may be in a local zone with the communication device 102, whereas the external devices 110-314 may be in a foreign zone apart from the communication device 102.

At act 208, a determination is made as to whether a communication protocol according to which the access attempt received at act 204 is structured is enabled for the transmitting device. As discussed in greater detail below with respect to FIG. 3, a communication protocol may be enabled only for certain IP addresses or zones, or may be enabled for all devices. If communications from the transmitting device which are structured according to the communication protocol are enabled (208 YES), then the process continues to act 210. At act 210, the access attempt is allowed, and the receiving device is permitted to process the access attempt. The process 200 ends at act 212.

If the communication protocol is not enabled for the transmitting device (208 NO), then the process continues to act 214. At act 214, the access attempt is denied, and the communication device 102 is denied access to the access attempt. At optional act 216, a notification indicative of the denial of the access attempt is sent to a user. The notification may include information indicative of a time at which the access attempt was received, an IP or MAC address of the attempt, a zone of the attempt, and a communication protocol according to which the access attempt is structured. In another embodiment, a log may be kept indicating each denial of access attempt with or without notifying the user each time an access attempt is denied. The process 200 ends at act 212.

Figure 3:
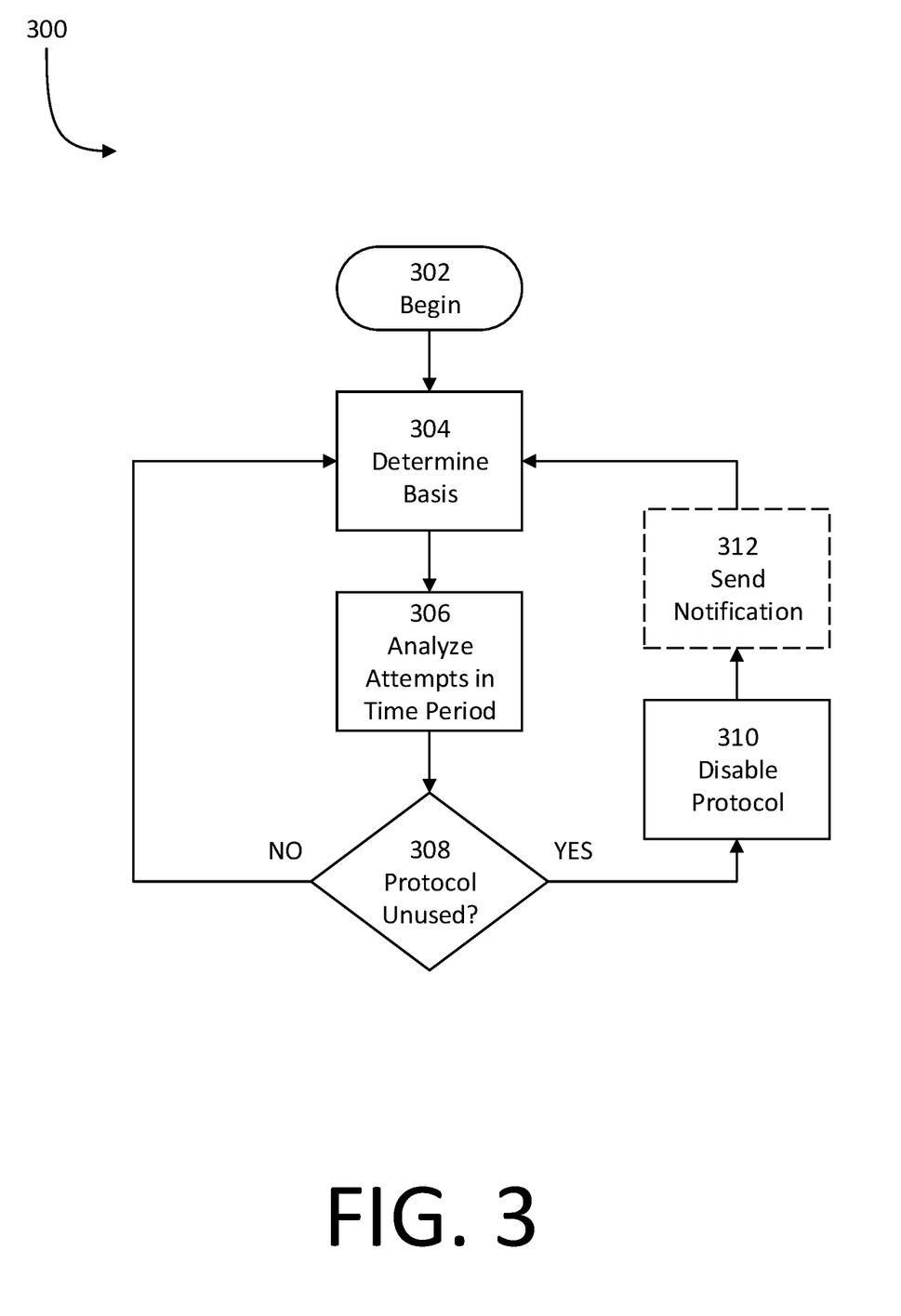
FIG. 3 illustrates a process enabling and disabling communication protocols according to an embodiment.

FIG. 3 illustrates a process 300 of determining whether to enable or disable communication protocols according to an embodiment. The process 300 may be executed by the communication device 102 (for example, by the network interface 104) to identify communication protocols which have not been used within a specified time period and, responsive to identifying the communication protocols, disabling the communication protocols based on a determined basis. The process 300 includes acts of determining a basis on which to enable and disable communication protocols, analyzing access attempts in a time period, determining if a communication protocol is unused, disabling a communication protocol responsive to determining that the communication protocol is unused, and optionally sending a notification indicative of the disabling.

At act 302, the process 300 begins. At act 304, a determination is made as to a basis on which to enable or disable communication protocols. In one embodiment, communication protocols may be enabled or disabled on a per-zone basis. As discussed above, zones may include a local zone, which includes devices on a same subset or segment as the communication device 102, and a foreign zone, which includes devices not on a same subset or segment as the communication device 102. In the per-zone basis, communication protocols will be enabled or disabled for entire zones, rather than individual devices in the zones. In another embodiment, communication protocols may be enabled or disabled on a per-IP or per-MAC address basis. In the per-IP or per-MAC address basis, communication protocols will be enabled or disabled for individual devices, regardless of which zone they are in. A user may configure a device executing the process 300 to select one of the per-zone basis and the per-IP or per-MAC address basis.

At act 306, access attempts in a time period are analyzed to determine communication protocols which have been used in the time period on the basis determined at act 304. For example, the time period may be seven days in one example. As discussed above with respect to act 206, access attempts may be stored with a respective timestamp indicating a time at which the timestamp is received. Accordingly, in an example in which the time period is a week, all access attempts having a timestamp recorded within the past seven days are analyzed. On a per-IP or per-MAC address basis, the access attempts are analyzed to determine each communication protocol used by each device identified by the IP or MAC address within the time period. On a per-zone basis, the access attempts are analyzed to determine each communication protocol used by each zone within the time period.

At act 308, a determination is made as to whether a previously enabled communication protocol is unused. For example, the determination may include determining if a communication protocol that was previously enabled for a device or zone has not been used in any access attempts or in more than a predetermined number of access attempts (for example, three) received from the device or zone within the same time period or within another time period. If not (308 NO), then the process 300 returns to act 304. Otherwise (308 YES), the process 300 continues to act 310.

At act 310, an unused, previously enabled communication protocol is disabled for the device or zone in accordance with the basis determined at act 304. For example, on a per-device basis, act 310 may include disabling the communication protocol for a transmitting device if no access attempts structured according to the communication protocol have been received from the device. On a per-zone basis, act 310 may include disabling the communication protocol for an entire zone if no access attempts structured according to the communication protocol have been received from any devices in the zone.

Once a communication protocol is disabled, communications from the device or zone structured according to the disabled communication protocol are ignored as discussed above with respect to act 208. At optional act 312, a notification may be sent to a user. The user may be an authenticated user trusted to grant or deny permission for the device or zone to use the communication protocol. Where permission is granted, the user may grant permission for a specific number of access attempts, for a fixed period of time, or permanently for the device or zone. The user may later access a list of communication protocols and manually enable or disable the communication protocols by device or zone as desired. The process 300 returns to act 304.

In some embodiments, the process 300 may be executed continuously. In other embodiments, the process 300 may be executed at fixed intervals, such as every hour. In other embodiments, the process 300 may be executed whenever initiated by a user. In yet another embodiment, the process 300 may be executed at irregular intervals. In one embodiment, the process 300 may not be executed for a first time until the time period described above with respect to act 306 has elapsed after activating a device executing the process 300, thereby enabling all communications until the time period has elapsed.

In some embodiments, the communication device 102 may be configured to automatically analyze all communication protocols by executing the process 300 with respect to all communication protocols. In other embodiments, the communication device 102 may automatically analyze some communication protocols by executing the process 300, and may treat other communication protocols in a different manner. For example, other communication protocols may be designated to be permanently on, permanently off, or local-only. The communication device 102 may designate each communication protocol and may respond to communications received according to a corresponding protocol in a manner determined, at least in part, by the corresponding designation. A communication structured according to a communication protocol selected to be permanently on will be allowed regardless of a zone or device from which a communication originates, and regardless of how recently the communication protocol was used. A communication structured according to a communication protocol selected to be permanently off will be denied regardless of a zone or device from which the communication originates, and regardless of how recently the communication protocol was used.

A communication structured according to a communication protocol selected to be local-only will be allowed if it originates from a local zone regardless of how recently the communication protocol was used, and may or may not allow the communication if it originates from a foreign zone. For example, the process 300 may be executed with respect to a foreign communication structured according to a communication protocol selected to be local-only to determine if the communication protocol was used recently enough, or the foreign communication may be denied outright regardless of how recently the communication protocol was used. Similarly, a communication structured according to a communication protocol selected to be foreign-only will be allowed if it originates from a foreign zone regardless of how recently the communication protocol was used, and may or may not allow the communication if it originates from a local zone.

In one embodiment, automatically analyzed communication protocols may include at least one of http, https server (inbound), SNMP v1, SNMP v3, FTP server (inbound), SCP, Modbus TCP, BACNet TCP, ICMP server (inbound pings), or IGMP. Permanently-on communication protocols may include at least one of SMTP, SNMP trap transmitter, FTP/SCP client, syslog, http/https client, ICMP client (outbound pings), radius, or NTP. All other communication protocols may be permanently off, local-only, or foreign-only in this example.

In certain embodiments, one or more designated protocols (for example, http, https, or a console port) may be exempt from being disabled to ensure that the communication device 102 is always accessible via at least one communication protocol to prevent users from being permanently locked out of the communication device 102. In one example, an exempt protocol may change subject to certain conditions. For example, an exempt protocol for the communication device 102 may be http until the communication device 102 receives a communication structured according to https, after which http is no longer an exempt protocol and https is an exempt protocol. Another exempt communication protocol, such as a wired console port, may be permanently on regardless of any changed conditions.

Furthermore, in some embodiments, if a secure communication protocol is being automatically analyzed and is enabled, then an unsecure counterpart of the secure communication protocol may be disabled. For example, if SNMP v3 is used and thereby enabled, then SNMP v1 may be disabled. In another example, if https is used and thereby enabled, then http may be disabled. In another example, if SCP is used and thereby enabled, then FTP may be disabled.

In some examples, the communication device 102 may be configured to operate in one of several different modes of operation. Modes of operation may be selected by a user. For example, the communication device 102 may have a physical interface through which modes of operation may be selected. In one example, the communication device 102 may have a group of buttons, each corresponding to a mode of operation, which may be actuated by a user to enter the selected mode of operation. Because a user requires physical access to the communication device 102 to actuate the buttons, it may be assumed that the user is an authenticated user if they have physical access to change the mode of operation of the communication device 102.

In one example, the communication device 102 may be configured to operate in at least one of an on mode of operation, an off mode of operation, a local-only mode of operation, or an auto mode of operation. In the on mode of operation, all access attempts are allowed regardless of a communication protocol according to which the access attempts are structured, a zone or device from which the access attempt originates, and how recently the communication protocol was used. In the off mode of operation, all access attempts are denied regardless of a communication protocol according to which the access attempts are structured, a zone or device from which the access attempt originates, and how recently the communication protocol was used. In the local-only mode of operation, all access attempts are allowed regardless of a communication protocol according to which the access attempts are structured, and how recently the communication protocol was used, provided that the access attempts originate from a local device. In the auto mode of operation, all access attempts are analyzed in accordance with the process 300 regardless of the communication protocol according to which the access attempts are structured.

As discussed above, the communication device 102 may execute protocol monitoring to optimize security of the communication device 102. Protocol monitoring may be executed in connection with the processes 200 and 300 using components of the communication device 102, including the network interface 104, the controller 116, and the storage 118. Using data stored in associated memory, the controller 116 may execute one or more instructions stored on one or more non-transitory computer-readable media that may result in manipulated data. In some examples, the controller 116 may include one or more processors or other types of controllers. In another example, the controller 116 includes a Field-Programmable Gate Array (FPGA) controller. In yet another example, the controller 116 performs a portion of the functions disclosed herein on a processor and performs another portion using an Application-Specific Integrated Circuit (ASIC) tailored to perform particular operations. As illustrated by these examples, examples in accordance with the present disclosure may perform the operations described herein using many specific combinations of hardware and software and the disclosure is not limited to any particular combination of hardware and software components. In some embodiments, the protocol monitoring techniques, including the processes 200 and 300, may be executed by the network interface 104 (which may include, for example, an NMC), in combination with, or independently from, the controller 116.

At least some embodiments provided herein operate to decrease an attack surface through which devices may be accessed by malicious users without requiring excessive user interaction to select communication protocols to enable. Accordingly, computer system functionality may be enhanced at least because system security is enhanced while a requirement for user interaction is beneficially reduced. Existing systems typically do not effectively prevent unauthorized communication with an end device on a communication network without requiring excessive user interaction. Requiring the user interaction may involve training users, which may be expensive and time-consuming. Requiring the user interaction may make the system more complicated to use, increasing the risk of user error and exposing the system to digital-security threats. Designing a system that addresses these deficiencies in current systems is a technical problem. In an exemplary embodiment of a system for preventing unauthorized communication with an end device on a communication network, the system may receive access attempts from an external device during a first period of time. These access attempts may be structured according to communication protocols and are received from communication zones. The system may determine a group of used communication protocols, receive an access attempt structured according to another communication protocol (i.e., not in the group), and deny the access attempt responsive to determining that the communication protocol is not in the group. At least this foregoing combination of features comprises a system that serves as a technical solution to the foregoing technical problem. This technical solution is not routine, is unconventional, and is not well-understood in the field of digital security. This technical solution is a practical application of the exemplary system at least because it solves the foregoing technical problem and constitutes an improvement in the technical field of digital security at least by increasing the system's digital security.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A system for preventing unauthorized communication with an end device on a communication network, the system comprising:
   at least one external device; and
   a communication device communicatively coupled to the at least one external device, the communication device including:
      a network interface configured to be communicatively coupled to the at least one external device, and being configured to:
         receive, during a first period of time, access attempts from the at least one external device, wherein one or more of the access attempts are structured according to a respective communication protocol and being received from a respective communication zone;
         add, responsive to receiving each access attempt of the access attempts received during the first period of time, each communication protocol according to which each access attempt of the access attempts received during the first period of time is structured to a first group of used communication protocols, the first group of used communication protocols further including an indication of the respective communication zones of the access attempts;
         receive, from a current external device after the first period of time, a current access attempt structured according to a current communication protocol not in the first group of used communication protocols; and
         deny the current access attempt responsive to at least one of:
            determining that the access attempts received during the first period of time do not include an access attempt received from the current external device and structured according to the current communication protocol; or
            determining that the access attempts received during the first period of time do not include an access attempt structured according to the current communication protocol and received from a device in a current zone, the current zone including the current external device.

2. The system of claim 1, wherein the communication device is further configured to determine a second group of unused communication protocols, the second group including unused communication protocols which are unused during the first period of time.

3. The system of claim 2, wherein the communication device is further configured to:
   disable the unused communication protocols; and
   send, responsive to disabling the unused communication protocols, a notification to a user indicating the disabling of the unused communication protocols.

4. The system of claim 2, wherein determining the second group of unused communication protocols unused during the first period of time is performed periodically.

5. The system of claim 2, wherein the communication device is further configured to determine a basis on which to identify unused communication protocols, the basis including at least one of a per-device basis or a per-zone basis.

6. The system of claim 5, wherein in denying the access attempt, the communication device is further configured to:
   determine that unused communication protocols are identified on the per-device basis;
   determine that an access attempt structured according to the communication protocol of the second group of unused communication protocols has not been received from the current external device in the first period of time; and
   disable the communication protocol for the current external device.

7. The system of claim 5, wherein in denying the access attempt, the communication device is further configured to:
   determine that unused communication protocols are identified on the per-zone basis;
   determine that an access attempt structured according to the communication protocol of the second group of unused communication protocols has not been received from a device in a first zone, the first zone being a same zone as the current external device in the first period of time; and
   disable the communication protocol for all devices in the first zone.

8. The system of claim 7, wherein the zone includes one of a foreign zone and a local zone, and wherein the foreign zone includes devices not on a same subnet as the communication device and the local zone includes devices on a same subnet as the communication device.

9. The system of claim 1, wherein the communication device is further configured to:
   receive a second access attempt structured according to a communication protocol of the first group of used communication protocols; and
   allow, responsive to determining that the communication protocol is one of the first group of used communication protocols, the second access attempt.

10. A non-transitory computer-readable medium storing thereon sequences of computer-executable instructions for preventing unauthorized communication with an end device on a communication network, the sequences of computer-executable instructions including instructions that instruct at least one processor to:
    receive, during a first period of time, access attempts from at least one external device, wherein one or more of the access attempts are structured according to a respective communication protocol and being received from a respective communication zone;
    add, responsive to receiving each access attempt of the access attempts received during the first period of time, each communication protocol according to which each access attempt of the access attempts received during the first period of time is structured to a first group of used communication protocols, the first group of used communication protocols including an indication of the respective communication zones of the access attempts;
    receive, from a current external device after the first period of time, a current access attempt structured according to the current communication protocol not in the first group of used communication protocols; and
    deny the current access attempt responsive to at least one of:
       determining that the access attempts received during the first period of time do not include an access attempt received from the current external device and structured according to the current communication protocol; or determining that the access attempts received during the first period of time do not include an access attempt structured according to the current communication protocol and received from a device in a current zone, the current zone including the current external device.

11. The non-transitory computer-readable medium of claim 10, wherein the sequences of computer-executable instructions further include instructions that instruct the at least one processor to determine a second group of unused communication protocols, the second group including unused communication protocols which are unused during the first period of time.

12. The non-transitory computer-readable medium of claim 11, wherein the sequences of computer-executable instructions further include instructions that instruct the at least one processor to:
    disable the unused communication protocols; and
    send, responsive to disabling the unused communication protocols, a notification to a user indicating the disabling of the unused communication protocols.

13. The non-transitory computer-readable medium of claim 11, wherein the sequences of computer-executable instructions further include instructions that instruct the at least one processor to determine the second group of unused communication protocols periodically.

14. The non-transitory computer-readable medium of claim 11, wherein the sequences of computer-executable instructions further include instructions that instruct the at least one processor to determine a basis on which to identify unused communication protocols, the basis including at least one of a per-device basis or a per-zone basis.

15. The non-transitory computer-readable medium of claim 14, wherein in instructing the at least one processor to deny the access attempt, the sequences of computer-executable instructions further include instructions that instruct the at least one processor to:
    determine that unused communication protocols are identified on the per-device basis;
    determine that an access attempt structured according to the communication protocol of the second group of unused communication protocols has not been received from the current external device in the first period of time; and
    disable the communication protocol for the current external device.

16. The non-transitory computer-readable medium of claim 14, wherein in instructing the at least one processor to deny the access attempt, the sequences of computer-executable instructions further include instructions that instruct the at least one processor to:
    determine that unused communication protocols are identified on the per-zone basis;
    determine that an access attempt structured according to the communication protocol of the second group of unused communication protocols has not been received from a device in a first zone, the first zone being a same zone as the current external device in the first period of time; and
    disable the communication protocol for all devices in the first zone.

17. The non-transitory computer-readable medium of claim 16, wherein the zone includes one of a foreign zone and a local zone, and wherein the foreign zone includes devices not on a same subnet as the communication device and the local zone includes devices on a same subnet as the communication device.

18. The non-transitory computer-readable medium of claim 10, wherein the sequences of computer-executable instructions further include instructions that instruct the at least one processor to:
    receive a second access attempt structured according to a communication protocol of the first group of used communication protocols; and
    allow, responsive to determining that the communication protocol is one of the first group of used communication protocols, the second access attempt.

19. A method for preventing unauthorized communication with an end device on a communication network comprising:
    receiving, during a first period of time, access attempts from the at least one external device, wherein one or more of the access attempts are structured according to a respective communication protocol and being received from a respective communication zone;
    adding, responsive to receiving each access attempt of the access attempts received during the first period of time, each communication protocol according to which each access attempt of the access attempts received during the first period of time were structured to a first group of used communication protocols, the first group of used communication protocols further including an indication of the respective communication zones of the access attempts;
    receiving, from a current external device after the first period of time, a current access attempt structured according to a current communication protocol not in the first group of used communication protocols; and
    denying the current access attempt responsive to at least one of:
        determining that the access attempts received during the first period of time do not include an access attempt received from the current external device and structured according to the current communication protocol; or
        determining that the access attempts received during the first period of time do not include an access attempt structured according to the current communication protocol and received from a device in a current zone, the current zone including the current external device.

20. The method of claim 19, further comprising:
    determining a second group of unused communication protocols, the second group including unused communication protocols which are unused during the first period of time; and
    disabling the unused communication protocols.

* * * * *

UNITED STATES PATENT AND TRADEMARK OFFICE
CERTIFICATE OF CORRECTION

| | |
|---|---|
| PATENT NO. | : 11,323,455 B2 |
| APPLICATION NO. | : 16/411304 |
| DATED | : May 3, 2022 |
| INVENTOR(S) | : Gary R. Ware |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this
Twentieth Day of December, 2022

Katherine Kelly Vidal
*Director of the United States Patent and Trademark Office*